United States Patent
Cunha et al.

(10) Patent No.: US 8,713,909 B2
(45) Date of Patent: May 6, 2014

(54) ELIMINATION OF UNFAVORABLE OUTFLOW MARGIN

(75) Inventors: Francisco J. Cunha, Avon, CT (US); Timothy S. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 906 days.

(21) Appl. No.: 12/397,442

(22) Filed: Mar. 4, 2009

(65) Prior Publication Data
US 2011/0180620 A1 Jul. 28, 2011

(51) Int. Cl.
*F02K 7/18* (2006.01)
*F02C 3/10* (2006.01)

(52) U.S. Cl.
USPC .................................. 60/204; 60/761; 60/266

(58) Field of Classification Search
USPC ........... 60/761, 762, 763, 764, 765, 766, 266, 60/806, 204
See application file for complete search history.

(56) References Cited

U.S. PATENT DOCUMENTS

| | | | |
|---|---|---|---|
| 3,240,468 A * | 3/1966 | Watts et al. | 416/97 R |
| 3,747,345 A * | 7/1973 | Markowski | 60/762 |
| 4,989,406 A | 2/1991 | Vdoviak et al. | |
| 5,312,227 A | 5/1994 | Grateau et al. | |
| 5,400,589 A * | 3/1995 | Mahias et al. | 60/762 |
| 5,685,140 A * | 11/1997 | Clements et al. | 60/204 |
| 6,098,401 A * | 8/2000 | Alassoeur et al. | 60/763 |
| 6,751,944 B2 | 6/2004 | Lair | |
| 6,983,601 B2 | 1/2006 | Koshoffer | |
| 7,100,358 B2 | 9/2006 | Gekht et al. | |
| 7,195,456 B2 | 3/2007 | Aggarwala et al. | |
| 7,322,195 B2 | 1/2008 | Borja et al. | |
| 2003/0049125 A1* | 3/2003 | Bolms et al. | 416/97 R |
| 2005/0081509 A1* | 4/2005 | Johnson | 60/761 |
| 2005/0089393 A1* | 4/2005 | Zatorski et al. | 415/115 |
| 2006/0260127 A1 | 11/2006 | Gekht et al. | |
| 2007/0220893 A1 | 9/2007 | Woltmann et al. | |
| 2007/0251760 A1 | 11/2007 | Baarck et al. | |
| 2009/0010765 A1* | 1/2009 | Propheter-Hinckley et al. | 416/97 R |

* cited by examiner

*Primary Examiner* — Ted Kim
(74) *Attorney, Agent, or Firm* — Kinney & Lange, P.A.

(57) ABSTRACT

A panel for use in a gas turbine engine exhaust case is disclosed. The panel has an airfoil section and a flow diverting structure adjacent a leading edge, wherein the flow diverting structure directs fluid flow into an area of the airfoil that lacks sufficient internal pressure for cooling fluid flow.

11 Claims, 6 Drawing Sheets

ELIMINATION OF UNFAVORABLE OUTFLOW MARGIN

STATEMENT OF GOVERNMENT INTEREST

The U.S. Government has a paid-up license in this invention and the right in limited circumstances to require the patent owner to license others on reasonable terms as provided for by the terms of Contract Number N00019-02-C-3003 awarded by United States Navy.

BACKGROUND

This invention relates generally to gas turbine engines and more particularly to elimination of unfavorable outflow margins in turbine exhaust cases.

For particular operations, particularly in military operations, it is desirable to have aircraft with conventional take-off and landing (CTOL) capabilities, and short take-off vertical landing (STOVL) capabilities. CTOL requires conventional thrusting of the aircraft in the horizontal direction, while STOVL requires thrusting of the aircraft in vertical and intermediate directions. Some dual capability aircraft designs thus employ variable direction exhaust ducts for directing thrust produced by the exhaust nozzle in both the horizontal and vertical directions. Variable direction exhaust ducts typically comprise multiple co-axial exhaust duct segments having angled junctions, whereby the segments can be rotated with respect to each other to redirect the direction of thrust.

In STOVL applications, the lift-fan and roll-posts and the exhaust nozzle work in unison to develop vertical thrust in a powered-lift mode during short take-off/landing segment of the flight (STOVL-PL). The internal engine modules that distribute the flow inside the engine are driven by a dual-spool configuration with high and low-pressure turbines. After the low pressure turbine, the turbine exhaust case (TEC) is one of the last modules in the engine and functions to condition the gas flow before exiting through the exhaust, in either power-lift (STOVL-PL) or during augmentation at up-and-away (STOVL-UAA) flight modes.

In current designs, TEC panels have a local outer region which lacks sufficient internal static pressure for the air flow to discharge into the external gas path via film cooling holes that characterize local TEC design porosity. In turn, insufficient internal pressure leads to a negative outflow-margin in a critical region towards the TEC outer diameter (OD) clockwise (CW) side of the panel. Externally, the gas flow approaches the TEC airfoil at an angle that, upon impact, creates a "bow wave" that surrounds a region that covers the CW side of the vane with high external pressure levels. Simultaneously, if there are decrements to the internal pressure levels, the internal-to-external pressure difference decreases leading to an inflow condition or negative outflow margin.

As the internal cooling flow passes through fan duct blocker in the supply duct before turning into the TEC, a series of pressure drops occurs due to action of roll-post and fan duct blocker flow area variation, particularly during powered-lift. This decreases TEC internal pressure leading to inflow conditions at the TEC critical areas, as is known in the art.

Thermally, and as a consequence of negative outflow margin, the TEC metal temperatures increase to a point closely related to the material limit range of 645-705 degrees Celsius, depending on mechanical stress. This can lead to damage or failure of the TEC panel and airfoils, thus resulting in costly repair or replacement of the TEC panel. Thus, a better system for cooling the critical areas of TEC panels is desirable.

SUMMARY

In one embodiment, a panel for use in a gas turbine engine exhaust case that has a cooling bypass fluid flowing adjacent the exhaust case is disclosed. The panel has an airfoil section and a flow diverting structure adjacent a leading edge, wherein the flow diverting structure directs cooling bypass fluid flow into an area of the airfoil that lacks sufficient internal pressure for cooling fluid flow.

In another embodiment, a turbine exhaust case is disclosed. The turbine exhaust case has a forward outer diameter ring, a forward inner diameter ring, an outer diameter case attached to the outer diameter ring, an inner diameter case attached to the inner diameter ring, a flame tube attached to an aft end of the inner diameter case, and a plurality of airfoils mounted between the inner diameter case and outer diameter case. A bypass cooling fluid travels adjacent the outer diameter case. At least one of the plurality of airfoils has a flow diverting structure adjacent the leading edge and the outer diameter ring. The flow diverting structure directs bypass cooling fluid flow into an area of the airfoil that lacks sufficient internal pressure for cooling fluid flow.

In yet another embodiment, a method of reducing unfavorable outflow margin in the cooling flow of a turbine exhaust case is disclosed. Turbine exhaust gases are directed to a plurality of hollow airfoils within the turbine exhaust case. A cooling bypass flow is directed to a radial outer side of the turbine exhaust case. A flow diverting structure is provided adjacent a leading edge of one of the plurality of hollow airfoils. The flow diverting structure directs fluid flow into an area of the airfoil that lacks sufficient internal pressure for cooling fluid flow.

DETAILED DESCRIPTION

Figure 1:
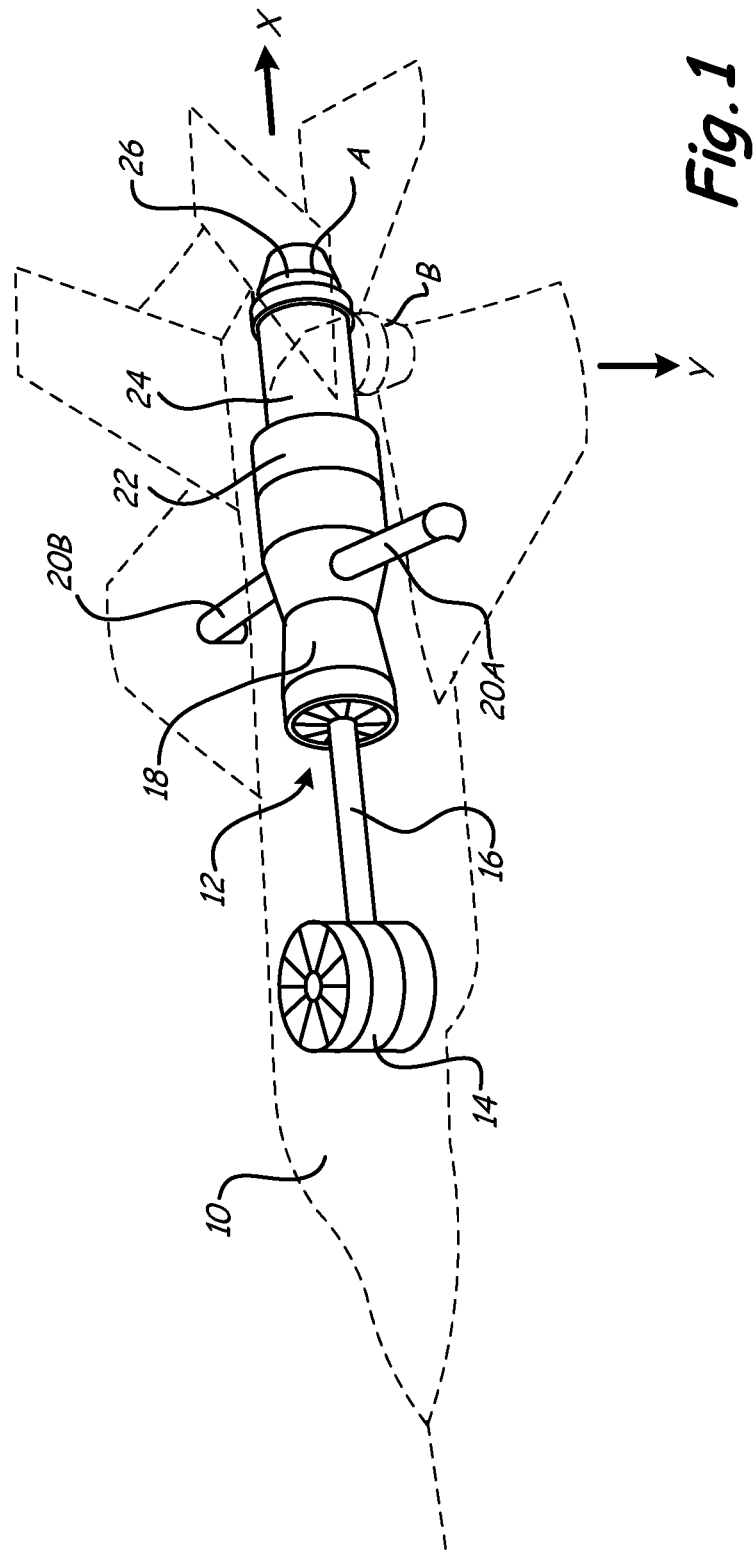
FIG. 1 is a perspective view of a jet-powered aircraft in phantom having a STOVL capable gas turbine engine.

FIG. 1 shows jet-powered aircraft 10 having short take-off vertical landing (STOVL) gas turbine engine 12. Engine 12 includes multiple thrust producing and thrust directing elements which enable aircraft 10 to take-off on a shortened runway and land vertically. Engine 12 includes lift fan 14, lift fan shaft 16, power plant 18, control ducts 20A and 20B, turbine exhaust case 22, three bearing swivel duct 24 and exhaust nozzle 26. Power plant 18 is the primary thrust-producing element of engine 12 and is used to produce thrust oriented in the x direction. Power plant 18 contains a compressor, a combustor, and high pressure and low pressure turbine sections. Air enters the front of power plant 18, and a portion goes to both a bypass and into the compressor. The compressor compresses the air and directs it into the combustor, where it is mixed with fuel and ignited. The exhaust from the combustor drives the turbine sections to produce thrust. Upon exiting the turbine sections, the exhaust enters turbine exhaust case 22.

Three bearing swivel duct (3BSD) 24 directs the thrust of power plant 18 in the x direction when in configuration A (as shown by 3BSD 24 in solid lines). 3BSD 24 is adjustable to redirect the thrust of power plant 18 in the y direction when in configuration B (as shown by 3BSD 24 in dashed lines). 3BSD 24 is also be used to produce thrust in intermediate directions. Nozzle 26 increases and focuses the thrust produced by power plant 18 and is secured to the tail end of 3BSD 24. 3BSD 24 is used in configuration A during traditional take off and flight operations of aircraft 10 in the x direction. 3BSD 24 is positioned in intermediate directions to facilitate short take-off operations. 3BSD 24 is positioned in configuration B to assist lift fan 14 in vertical landing operations.

Lift fan 14 is selectively driven by power plant 18 through lift fan shaft 16, and is used to produce thrust in the y direction near the forward portion of aircraft 10. With 3BSD 24 producing thrust near the aft portion of aircraft 10, lift fan 14 and power plant 18 control the pitch of aircraft 10. During vertical landing operations, control ducts 20A and 20B redirect a portion of the thrust produced by power plant 18 in the y direction underneath the wings, at a location away from the axis on which power plant 18 and lift fan 14 produce thrust in the y direction. Control ducts 20A and 20B are selectively engaged to balance the roll of aircraft 10 during vertical landing and take-off operations.

Figure 2:
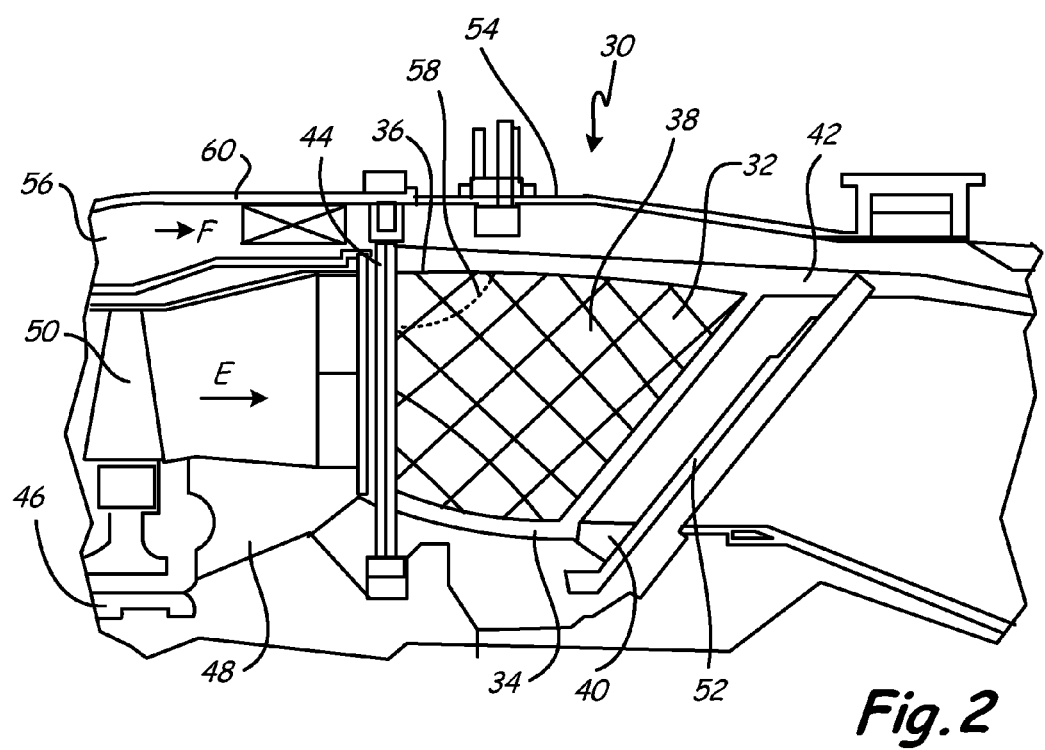
FIG. 2 is a cross-sectional view of the turbine exhaust case of the jet-powered aircraft illustrated in FIG. 1.

FIG. 2 is a cross-sectional view of a portion of jet-powered aircraft 10 illustrated in FIG. 1 including turbine exhaust case 30. Turbine exhaust case 30 includes turbine exhaust case (TEC) panel 32 between inner diameter case 34 and outer diameter case 36. Panel 32 is a hollow airfoil constructed from sheet metal, composites, ceramics or similar materials known in the art. Panel 32 contains a series of iso-grid supports 38 on the interior surfaces that provide structural support for panel 32. Inner case 34 is connected to inner ring 40, and outer case 36 is connected to outer ring 42. Inner case 34, outer case 36, inner ring 40, and outer ring 42 are all constructed from metal made to withstand the temperatures of exhaust gases leaving the turbine.

Tie rods 44 secure the turbine exhaust case to the rest of the engine assembly. Turbine exhaust case 30 supports aft bearing 46 of the engine through bearing support 48. Exhaust gases E leave last turbine stage 50 and enter turbine exhaust case 30. At the opposite end of turbine exhaust case 30, augmentor spray bar 52 may be attached adjacent panel 32, which along with flameholders, are axially located between the turbines and an exhaust nozzle at a downstream end of the combustion zone for injecting additional fuel when desired during reheat, thrust augmentation, or afterburning operation for burning in the augmentor combustor for producing additional thrust.

Radially outward of turbine exhaust case 30 and outer engine case 54 is bybass flow passage 56. Bypass flow fluid F, typically air, enters the front of power plant 18 and travels adjacent the compressor and turbines and is bled off to cool the various components of engine 12. Fluid F is also used to cool the components of turbine exhaust case 30, including panel 32. Typically, air enters panel 32 and flows through the hollow airfoil between the iso-grids 38. Fluid then exits cooling holes in panel 32 to create a film cooling effect on the outer surfaces of the airfoil of panel 32. A local outer area, depicted by line 58, is a critical area requiring cooling. To assure adequate cooling fluid flow in the area, a flow diverting structure may be installed adjacent this area.

Figure 3:
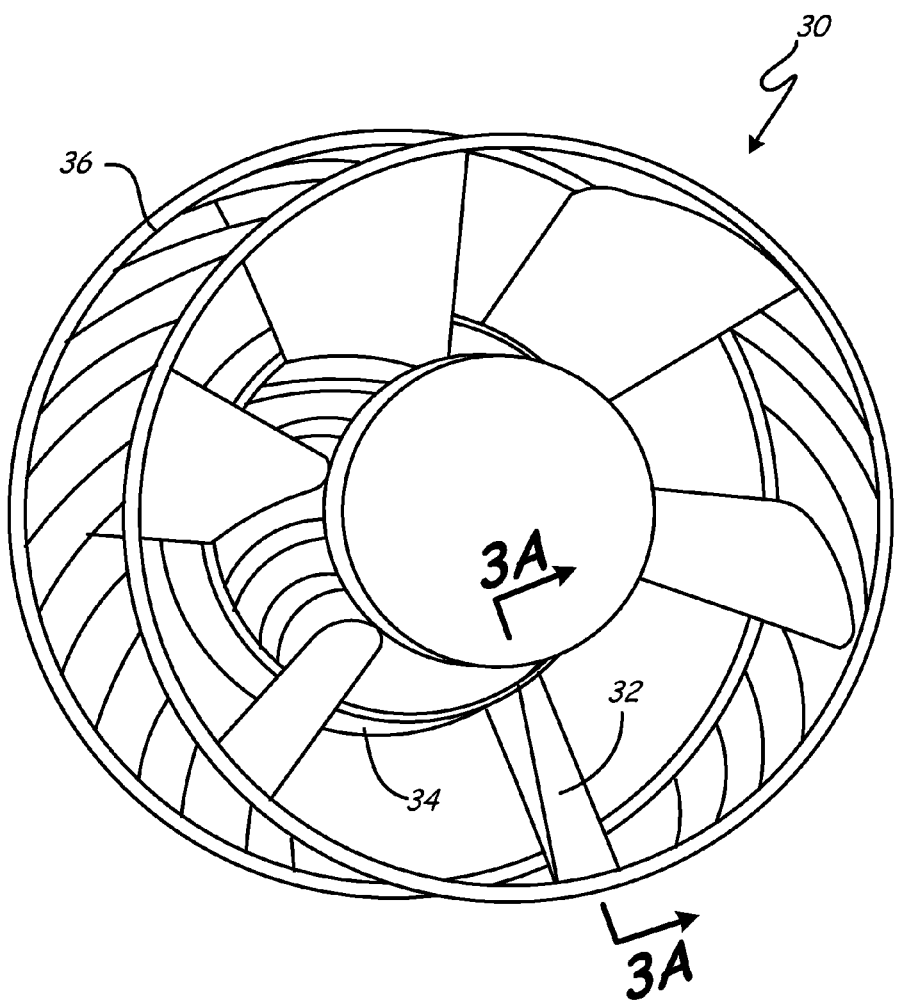
FIG. 3 is perspective view of a portion of the turbine exhaust case containing several radial turbine exhaust case panels.
Figure 3A:
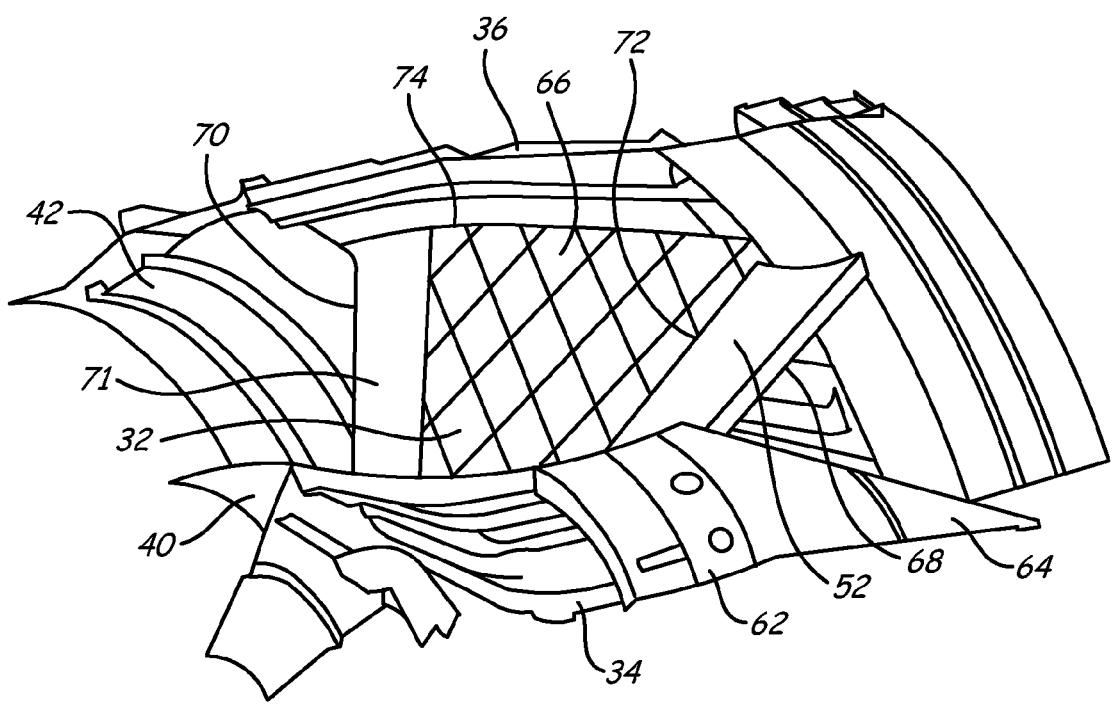
FIG. 3A is an perspective view of one of the turbine exhaust case panels illustrated in FIG. 3.

FIG. 3 is a perspective view of a portion of turbine exhaust case 30 having inner case 34 and outer case 36 with panels 32 therebetween. Although illustrated as containing six panels, the figure is for illustrative purposes and turbine exhaust case 30 may have any number of panels 32 as required by design. FIG. 3A is perspective view of a portion of turbine exhaust case 30 illustrated in FIG. 3. The forward side of inner case 34 is connected to the aft end of inner ring 40, while the forward side of outer case 36 is connected to outer ring 42. Panel 32 extends between inner case 34 and outer case 36. Panel 32 contains a hollow airfoil with pressure side 66, suction side 68, leading edge 70, and trailing edge 72. Both pressure side 66 and suction side 68, as well as leading edge 70 and trailing edge 72, have a radially inner edge (not shown) and radially outer edge, as represented by radially outer edge 74 of pressure side 66. Leading edge 70 has a smooth surface 71 to promote airflow. This smooth surface extends across a portion of both pressure side 66 and suction side 68. In some embodiments, this is manufactured as a separate piece and joined to the rest of panel 32.

Augmentor spray bar 52 is connected adjacent trailing edge 72 of panel 32 at an acute angle to suction side 68. In one embodiment, spray bar 52 contains a box structure surrounding the spray nozzles, and has an extension that acts as a flameholder for the exhaust augmentation of engine 12. Flame tube ring 62 is connected to the aft end of inner case 34, and extends to join tailcone 64. In order to reduce the problem of negative margin outflow, panel 32 contains a flow diverting structure adjacent leading edge 70.

Figure 4:
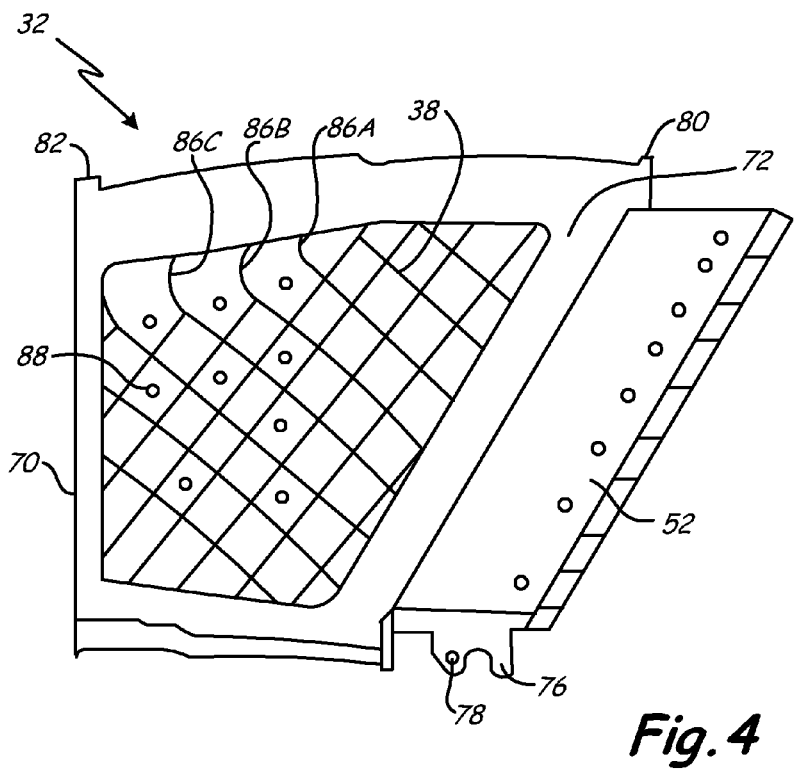
FIG. 4 is an elevation view of a turbine exhaust panel with a novel arrangement of internal iso-grids.

FIG. 4 is an elevation view of turbine exhaust panel 32. Panel 32 has leading edge 70 and trailing edge 72, with augmentor spray bar 52 attached to trailing edge 72. Also attached to the radially inner edge is flange 76 with aperture 78. Flange 76 allows attachment of panel 32 to turbine exhaust case 30 and the rest of engine 12 by insertion of a fastener into aperture 78. Panel 32 also has flanges 80, 82, which also aid in locating and securing panel 32 between inner case 34 and outer case 36 in turbine exhaust case 30.

Also illustrated in FIG. 4 are iso-grid supports 38. In this embodiment, the iso-grids 86a, 86b, and 86c contain an arcuate portion adjacent the radially outer edge and leading edge 70, which act to divert flow of fluid passing through the interior of panel 32, and are the flow diverting structures previously referred to. Additionally, portions of the iso-grids that would normally be present and transverse to 86a, 86b, and 86c have been eliminated. This creates a more open area for fluid flow, and thus reducing a cause of negative margin outflow, which may affect proper cooling of critical area 58. Cooling fluid can more easily enter the hollow airfoil and exit film cooling holes 88 to provide cooling of panel 32. This design allows for greater fluid flow without compromising the structural integrity of panel 32. Although illustrated as being in the critical area, this new arrangement of iso-grids 38 can be expanded to any portion of panel 32.

Figure 5:
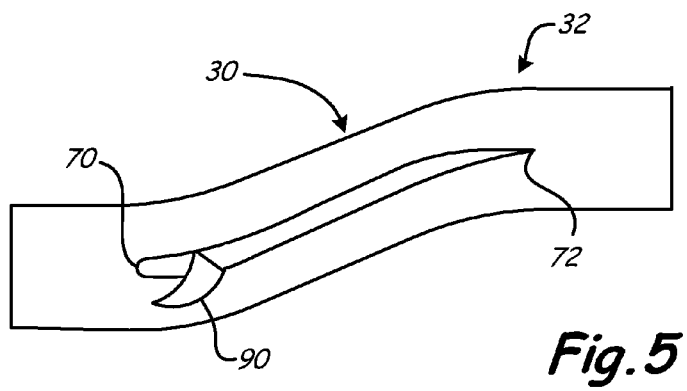
FIG. 5 is a plan view of a turbine exhaust panel containing a fluid scoop.
Figure 6:
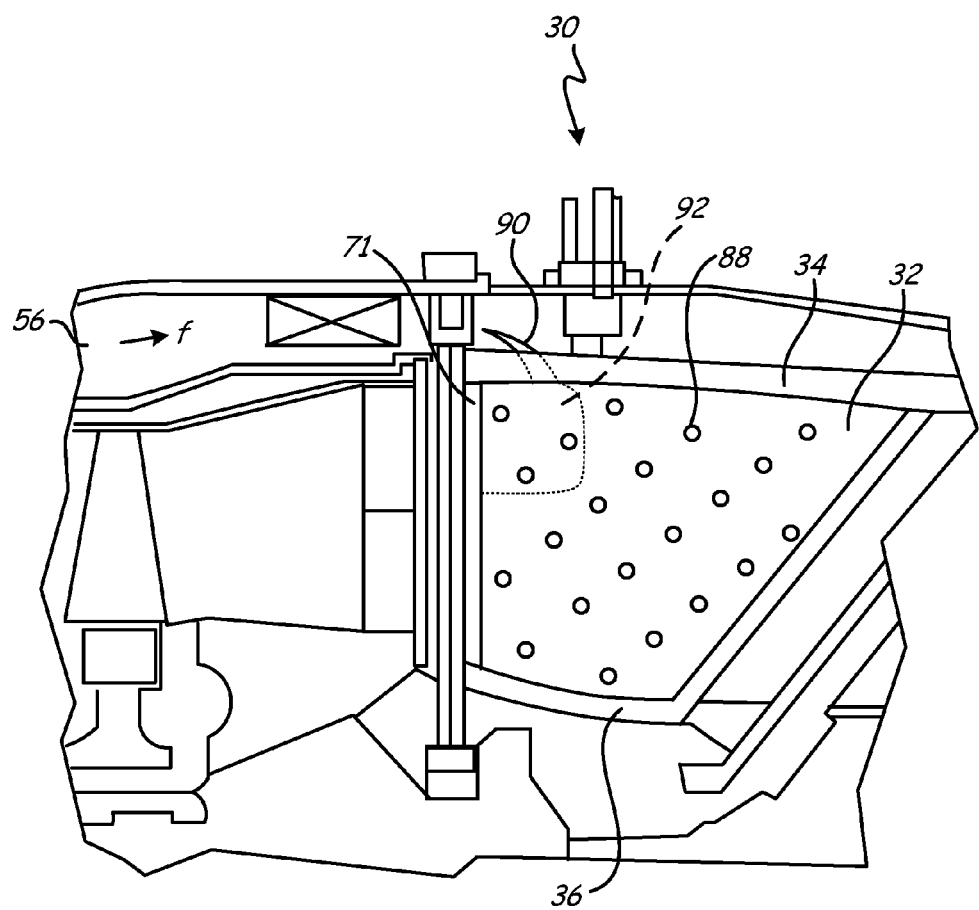
FIG. 6 is a cross-sectional view of a turbine exhaust case with a turbine exhaust case panel that contains a fluid scoop.

FIG. 5 is a plan view of a portion of turbine exhaust case 30 with turbine exhaust panel 32 containing fluid scoop 90. FIG. 6 is a cross-sectional view of turbine exhaust case 30 with turbine exhaust case panel 32 that contains fluid scoop 90. In this embodiment, a piece of material is formed to create fluid scoop 90 and attached adjacent the radially outer leading edge, which was previously noted as the critical area. The fluid scoop is a flow diverting structure that directs fluid flow into an area of the airfoil that lacks sufficient internal pressure for cooling fluid flow. As illustrated in FIG. 6, fluid scoop 90 is attached to panel 32 and may extend past inner case 34 into fluid passage 56. This assures that fluid scoop is in contact with fluid F and can divert some of the flow into the critical area of panel 32. In an alternate embodiment, fluid scoop 90 is contained entirely within panel 32, and extends from the radially outer edge of the airfoil towards the radially inner edge.

As illustrated in FIG. 5, fluid scoop 90 is connected to flow inhibitor 92. Flow inhibitor 92 is a rigid structure 32 that prevents the through flow of fluid within panel 32. The combination of fluid scoop 90 and flow inhibitor 92 provide internal pressure recovery for panel 32 in area adjacent flow inhibitor 92. In the embodiment illustrated, flow inhibitor 92 is comprised of two legs that form a right angle. In other embodiments, flow inhibitor 92 may be a straight piece running at an angle through panel 32, or may be an arcuate segment. Flow inhibitor 92 may entirely close off all fluid flow in panel 32. In an alternate embodiment, flow inhibitor 92 permits a limited flow of fluid in the area adjacent flow inhibitor 92.

With either of the above embodiments for a flow diverting device (fluid scoop 90 or arcuate isogrids 86a-86c), sufficient internal static pressure is created in critical area 58. The flow diverting devices prevent insufficient internal pressure that leads to a negative outflow margin in panel 32.

With the above embodiments of a TEC panel with a flow diverting structure, a method of reducing unfavorable outflow margin in the cooling flow of a turbine exhaust case is possible. First, turbine exhaust gases are directed to a plurality of hollow airfoils within the turbine exhaust case. Next, cooling bypass flow is directed to a radial outer side of the turbine exhaust case. A flow diverting structure is then provided adjacent a leading edge of one of the plurality of hollow airfoils. The flow diverting structure directs fluid flow into an area of the airfoil that lacks sufficient internal pressure for cooling fluid flow. This flow diverting structure may be either a fluid scoop as described, a modification of the iso-grid supports as described, or a combination thereof.

Although the present invention has been described with reference to preferred embodiments, workers skilled in the art will recognize that changes may be made in form and detail without departing from the spirit and scope of the invention.

The invention claimed is:

1. A turbine exhaust case panel for use in a gas turbine engine exhaust case that has a cooling bypass fluid flowing adjacent the exhaust case, the turbine exhaust case panel comprising:
   an airfoil section comprising a sheet paneled exterior and an iso-grid interior comprising a plurality of crossing iso-grid supports; and
   a flow diverting structure adjacent to a leading edge and a radially outer portion of the airfoil section having a plurality of curved iso-grids which lack at least one iso-grid support section, wherein the flow diverting structure directs a portion of the bypass cooling fluid into an area of the airfoil that lacks sufficient internal pressure for cooling fluid flow.

2. The turbine exhaust panel of claim 1 further comprising:
   a plurality of cooling holes in at least one of a pressure side and a suction side of the airfoil.

3. The turbine exhaust panel of claim 1 further comprising:
   an augmentor spray bar attached proximate to a trailing edge of the airfoil.

4. The turbine exhaust panel of claim 1 further comprising:
   at least one flange for connecting the panel to the turbine exhaust case, the flange extending from either a radially inner edge or a radially outer edge of either a pressure side or a suction side.

5. A turbine exhaust case comprising:
   a forward outer diameter ring;
   a forward inner diameter ring;
   an outer diameter case attached to the outer diameter ring, wherein a bypass cooling fluid travels adjacent the outer diameter case;
   an inner diameter case attached to the inner diameter ring;
   a flame tube attached to an aft end of the inner diameter case; and
   a plurality of airfoils mounted between the inner diameter case and outer diameter case, the airfoils each comprising a sheet paneled exterior and an iso-grid interior comprising a plurality of crossing iso-grid supports; wherein at least one of the plurality of airfoils having a flow diverting structure adjacent the leading edge and a radially outer portion and the outer diameter ring, the flow diverting structure having a plurality of curved iso-grids which lack at least one iso-grid support section, and wherein the flow diverting structure directs a portion of the bypass cooling fluid into an area of the airfoil that lacks sufficient internal pressure for cooling fluid flow.

6. The turbine exhaust case of claim 5 further comprising:
   a box structure attached to a trailing edge of the airfoil and mounted between the inner case and outer case, the box structure being mounted at an acute angle with respect to the suction side of the airfoil.

7. The turbine exhaust case of claim 6 further comprising:
   an augmentor spray bar attached adjacent the box structure.

8. The turbine exhaust case of claim 5 further comprising:
   a plurality of cooling holes in either a pressure side or a suction side of the airfoil.

9. A method of reducing unfavorable outflow margin in the cooling flow of a turbine exhaust case, the method comprising:
   directing turbine exhaust gases to a plurality of hollow airfoils comprising a sheet paneled exterior and an iso-grid interior comprising a plurality of crossing iso-grid supports within the turbine exhaust case;
   directing a cooling bypass flow to a radial outer side of the turbine exhaust case;
   providing a flow diverting structure adjacent a leading edge and a radially outer portion of at least one of the plurality of hollow airfoils, the flow diverting structure having a plurality of curved iso-grids which lack at least one iso-grid support section, wherein the flow diverting structure directs fluid flow into an area of the airfoil that lacks sufficient internal pressure for cooling fluid flow.

10. The method of claim 9 further comprising:
    directing a portion of the cooling bypass flow into the hollow airfoils.

11. The method of claim 9 further comprising:
    providing cooling holes in the hollow airfoils to provide film cooling of the airfoil outer surfaces.

\* \* \* \* \*